(12) United States Patent
Koga et al.

(10) Patent No.: US 7,095,574 B2
(45) Date of Patent: Aug. 22, 2006

(54) OPTICAL PICKUP

(75) Inventors: Mio Koga, Osaka (JP); Takahiro Niwaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/075,742

(22) Filed: Mar. 10, 2005

(65) Prior Publication Data

US 2005/0207032 A1   Sep. 22, 2005

(30) Foreign Application Priority Data

Mar. 11, 2004   (JP)  ............ P 2004-068974

(51) Int. Cl.
  *G02B 7/02*   (2006.01)
(52) U.S. Cl. ............. 359/813; 359/811; 359/819; 359/820
(58) Field of Classification Search ........... 359/813, 359/811, 814, 819, 820, 821, 822
See application file for complete search history.

(56) References Cited

FOREIGN PATENT DOCUMENTS

| JP | 09-102133 | 4/1997 |
|----|-----------|--------|
| JP | 2001-325740 | 11/2001 |
| JP | 2002-042356 | 2/2002 |
| JP | 2002-352445 | 12/2002 |

*Primary Examiner*—Timothy Thompson
(74) *Attorney, Agent, or Firm*—Morgan, Lewis & Bockius LLP

(57) ABSTRACT

An optical pickup includes: a lens holder having an objective lens, an optical component, a radiator plate formed of a sheet metal, and a base member on which the lens holder and the optical component are mounted, the base member being formed of a synthetic resin molded body. The base member has a base plate portion in which a light passage hole is opened in such a manner as to face the objective lens, a mounting wall on which the optical component is mounted and a mounting piece of the radiator plate is secured, and an enclosure wall that is erected substantially on an opposite side to the mounting wall across the light passage hole. The surface plate portion extends toward the enclosure wall and an end of the surface plate portion is fixed to a top portion of the enclosure wall.

7 Claims, 6 Drawing Sheets

OPTICAL PICKUP

BACKGROUND OF THE INVENTION

1. Field of the Invention

The present invention relates to an optical pickup and more particularly to an optical pickup which is devised to allow the resonance frequency band of a base member on which a light emitting element and a collimator lens are installed to deviate from a vibration frequency band generated in association with the operation of a lens holder having an objective lens.

2. Description of the Related Art

FIG. 8 shows a plan view of an example of the schematic configuration of an optical disk apparatus using an optical pickup 1. In the drawing, the optical pickup 1 includes a base member 2 on which a lens holder 3 equipped with an objective lens 31 is installed and is controlled to access (or is controlled to travel to) an optical disk D along a radial direction thereof when bearings 21 and a rail bearing 22 which are provided on the base member 2 are caused to travel while being guided, respectively, by a guide shaft 52 and a guide rail 53 which are provided on a frame-shaped drive chassis 51. In addition, a rack 23 provided on the base member 2 meshes with a threaded shaft 54 mounted on the drive chassis 51, so that the rotational motion of the threaded shaft 54 is translated into the linear motion of the base member 2 by the rack 23. Furthermore, the drive chassis 54 is mounted on a frame 56 which is raised and lowered via a cam mechanism 55. The frame 56 is fixed to a stationary frame 57 such as a box body. Then, the optical disk D as a recording medium is mounted on a turntable 58 set on the frame 56 for rotation.

FIG. 9 is an explanatory drawing of an optical system of the optical pickup. As shown in the drawing, the optical system of the optical pickup includes the aforesaid objective lens 31 in addition to a light emitting element 32 made up of a light emitting diode or the like, a light receiving element 33, a half mirror 34 and a collimator lens 35, and the objective lens 31 is equipped on the lens holder 3, as has been described above, whereas the other components including the light emitting element 32 are mounted on the base member 2. Then, laser light emitted from the light emitting element 32 is guided to the collimator lens 35 by the half mirror 34 so as to become a flux of parallel light, which then transmits through the objective lens 31 so as to be emitted onto the optical disk D, and reflected light therefrom is received by the light receiving element 33 via the objective lens 31, the collimator lens 35 and the half mirror 34.

In this optical pickup, in order to correct a change in the positional relationship between the optical disk D and the objective lens 31 which would occur in association with the warp or eccentricity of the optical disk D, the lens holder 3 is controlled to be displaced in a focusing direction and a tracking direction relative to the optical disk D by the action of a driving unit 36. In general, the driving unit 36 is made up of a combination (not shown) of a supporting unit for supporting the lens holder 3 on the base member 2 in such a manner as to be displaced in the two directions, a coil and a magnet.

In the optical pickup, a proper vibration frequency used when the lens holder 3 is controlled to be displaced in the focusing direction and the tracking direction is adjusted so as to be accommodated within a certain band. Here, the vibration frequency of the lens holder 3 which has been properly adjusted is referred to as an adjusted frequency.

There is a case that the base member 2, on which the lens holder 3 which is controlled to be displaced in the focusing direction and the tracking direction is installed, resonates with the vibration of the lens holder 3 which occurs when the lens holder 3 is controlled to be displaced. Then, when the base member 2 resonates, the vibration of the base member 2 is then transmitted to the turntable 58 via the guide shaft 52 and the guide rail 53, the drive chassis 51 and the frame 56, which were described above by reference to FIG. 8, whereby since the optical disk D vibrates when the turntable 58 vibrates, the servo properties of the lens holder 3 are reduced, leading to the reduction in reliability in writing and reading by the optical pickup 1. Then, in the event that in the base member 2, the resonance frequency band overlaps the adjusted frequency of the lens holder 3 or resides in the vicinity thereof, even if the adjusted frequency has been set properly, the servo properties of the lens holder 3 are reduced, and no satisfactory value cannot be obtained for the writing and reading performance of the optical pickup 1, thereby resulting in the failure of adjustment.

The resonance of the base member 2 occurs prominently when the base member 2 is made of a thin synthetic resin molded body. FIG. 7B shows a gain curve and a phase curve in the focusing system when the base member 2 is made of a thin synthetic resin molded body, and in FIG. 7B, the resonance generated when the base member 2 resonated (vibrated) was transmitted to the turntable 58 to thereby cause the optical disk D to vibrate, and as a result, the gain curve or the phase curve was made to fluctuate irregularly in a range of 1 to 2 kHz (ranges where the irregular fluctuation occurred are indicated as G1, P1). Thus, when the gain curve or the phase curve of the base member 2 is caused to fluctuate irregularly in the range of 1 to 2 kHz, the vibration of the base member 2 is transmitted to the turntable 58 to thereby increase the vibration of the optical disk D, whereby the aforesaid adjustment is made difficult, possibly resulting in the reduction of focusing servo properties.

FIG. 10 is a schematic plan view of the base member 2 made of a synthetic resin molded body which is used in an optical pickup in the related art, and FIG. 11 is a view as seen in a direction indicated by an arrow XI in FIG. 10. On this base member 2, a light emitting element made up of a laser diode, not shown, is mounted and a radiator plate 7 made of a sheet metal is provided for radiating heat generated in the light emitting element. The radiator plate 7 includes a mounting piece 71 which is formed by bending part of the radiator plate 7 at right angles, a surface plate portion 72 and a projecting piece 73, and the mounting piece 71 is screwed to a mounting wall (not appearing in the drawing) of the base portion 2 at two locations with machine screws together with a radiator block 74 which is mounted on the light emitting element while the mounting piece 71 is being superimposed on the radiator block 74. In the conventional example, while the radiator plate 7 is screwed only to the mounting wall of the base member 2 with the machine screws, a collimator lens mounting hole (a light passage hole) 27, which is opened in a substantially central portion of a base plate portion of the base member 2, is covered with the surface plate portion.

Then, although the problem with the resonance of the base member 2 made of a synthetic resin molded body was attempted to be solved by devising the countermeasure in which the reinforcement rib is provided on the base plate portion 28 of the base member 2, since the mounting hole 27 is opened in the substantially central portion of the base plate portion, only with the reinforcement rib, a vibration mode such as bending and twisting is generated in the base member 2, and the resonance frequency band of the base member 2 which is generated when the lens holder 3 (refer to FIG. 8) is controlled to be displace has been unable to be made to deviate largely from the aforesaid adjusted frequency. Note that the gain curve or the phase curve which was explained above by reference to FIG. 7B is such as to be obtained as to the base member 2 constructed as has been described heretofore.

On the other hand, as to the optical pickup, there has been proposed a technique in which with a view to increasing the servo properties for access control by increasing the resonance frequency which deforms a fixing portion where a carriage and a holding member of a lens holder are fixed together, the rigidity of a location in the vicinity of the fixing portion is increased (refer to JP-A-9-102133). According to this technique, a cover obtained by pressing a sheet stainless steel is described as being fixed to upper surfaces of the carriage and a tracking coil. In addition, in an optical pickup device, with a view to suppressing the transmission of a reaction force of vibrations generated from a correction driving unit to a supporting body of a lens holder, there is proposed a means in which a supporting base and the supporting body are bonded together directly below a yoke functioning as the correction driving unit (refer to JP-A-2002-42356). Furthermore, it is described as a known example in which in an optical pickup device, optical system constituent components such as a semiconductor laser and a light receiving element are installed on a device frame made of a resin (refer to JP-A-2001-325740). Moreover, it is known that the optical system of an optical pickup is made up of a semiconductor laser, a collimator lens, a half mirror, a photo diode and the like (refer to JP-A-2002-352445)

SUMMARY OF THE INVENTION

The invention was made in view of the situations, and an object thereof is to, by paying attention to the fact that the radiator plate for suppressing the generation of heat in the light emitting element is mounted on the base member which is used in the conventional optical pickup, provide an optical pickup which can shift the resonance frequency band of the base member to a higher frequency side than the adjusted frequency band of the lens holder which is generated when the lens holder is controlled to be displaced by increasing the rigidity of the base member by making use of the radiator plate.

In addition, another object of the invention is to provide an optical pickup which has a superior writing and reading reliability by shifting the resonance frequency band of the base member to a higher frequency side than the adjusted frequency band of the lens holder which is generated when the lens holder is controlled to be displaced.

According to the invention, there is provided an optical pickup including: a lens holder having an objective lens that is displace controlled in a focusing direction and a tracking direction relative to an optical disk; an optical component that is adapted to cooperate with the objective lens so as to implement an emission of light to the optical disk and a reception of reflected light; a radiator plate formed of a sheet metal for radiating heat generated in the optical component, the radiator plate having amounting piece and a surface plate portion; and a base member on which the lens holder and the optical component are mounted, the base member being access controlled along a radial direction of the optical disk and being formed of a synthetic resin molded body, the base member having a base plate portion in which a light passage hole is opened in such a manner as to face the objective lens, a mounting wall on which the optical component is mounted and the mounting piece of the radiator plate is secured, the mounting wall being erected on the base plate portion, and an enclosure wall that is erected substantially on an opposite side to the mounting wall across the light passage hole; wherein the surface plate portion is formed by bending a base portion of the mounting piece and extends toward the enclosure wall and an end of the surface plate portion is fixed to a top portion of the enclosure wall.

According to the construction, even in the event that the base member is made of a synthetic resin molded body which is liable to generate resonance, the mounting piece for the radiator plate of a sheet metal adapted to suppress the generation of heat in the light emitting element and the edge of the end of the surface plate portion are secured to the base member on the both sides across the light passage hole opened in the base plate portion of the base member so as to help to increase the rigidity of the base member. Owing to this, the resonance of the base member is suppressed. Namely, since the resonance frequency of the base member is shifted to a higher frequency side, there is eliminated a risk that the resonance frequency band of the base member overlaps or approaches the adjusted frequency of the lens holder, whereby the writing and reading reliability of the optical pickup is increased.

The height of the enclosure wall is desirably determined such that the edge of the end of the surface plate portion is allowed to be superimposed on the top portion of the enclosure wall. According to the construction, the reinforcement function by the radiator plate is exhibited more prominently, thereby the rigidity of the base member being increased further.

According to the invention, it is possible to adopt a construction in which a superimposed portion resulting from the superimposition of the end of the surface plate portion on the top portion of the enclosure wall is point joined together with an adhesive. According to the construction, the surface plate portion and the enclosure wall can be secured to each other easily and quickly at the superimposed portion where the edge of the end of the surface plate portion is superimposed on the top portion of the enclosure wall.

According to the invention, the superimposed portion resulting from the superimposition of the end of the surface plate portion on the top portion of the enclosure wall may be point joined together with an adhesive at two locations at both end portions thereof. In addition, a construction maybe adopted in which a rib is erected on the base plate portion which intersects with the mounting wall and which is adapted to define an inwardly angled space in cooperation with the mounting wall and the base plate portion, and in which a projecting piece which is superimposed on a top potion of the rib so as to be point joined to the top portion with an adhesive is provided continuously to a stepped piece portion which is formed by being bent from the surface plate portion at a location adjacent to the mounting piece.

An optical pickup according to the invention may be constructed as follows. Namely, there may be provided an optical pickup including: a lens holder having an objective lens that is displace controlled in a focusing direction and a tracking direction relative to an optical disk; an optical component that is adapted to cooperate with the objective lens so as to implement an emission of light to the optical disk and a reception of reflected light; a radiator plate formed of a sheet metal for radiating heat generated in the optical component, the radiator plate having amounting piece and a surface plate portion; a base member on which the lens holder and the optical component are mounted, the base member being access controlled along a radial direction of the optical disk and being formed of a synthetic resin molded body, the base member having a base plate portion in which a light passage hole is opened in such a manner as to face the objective lens, a mounting wall on which the optical component is mounted and the mounting piece of the radiator plate is secured, the mounting wall being erected on the base plate portion, and an enclosure wall that is erected substantially on an opposite side to the mounting wall across the light passage hole; and a screw for securing the mounting piece to the mounting wall; wherein the surface plate portion is formed by bending a base portion of the mounting piece so as to cover the light passage hole and extends to the enclosure wall in such a manner that an end of the surface plate portion is superimposed on a top portion of the enclosure wall, and a superimposed portion is point joined together with an adhesive at two locations at both end portions thereof, whereby a resonance frequency band of a vibration of the base member which is generated in association with the displacement control of the lens holder in the focusing direction is shifted to a higher frequency side than a vibration frequency band of a vibration of the lens holder which is generated when the displacement control is implemented.

According to the optical pickup of the invention, since the radiator plate which is used in the conventional optical pickup to suppress the generation of heat in the light emitting element is made use of so as to serve as a reinforcement member for increasing the rigidity of the base member so as to shift the resonance frequency to the higher frequency side, even in the event that the light passage hole is opened in the base plate portion of the base member, the rigidity of the base member can easily be increased, and a necessity can also be obviated of mounting an extra member such as a cover on the base member. Due to this, the resonance frequency of the base member can be shifted to the higher frequency side without increasing the number of components so as to increase the writing and reading reliability of the optical pickup.

DETAILED DESCRIPTION OF THE PREFFERED EMBODIMENTS

Figure 1:
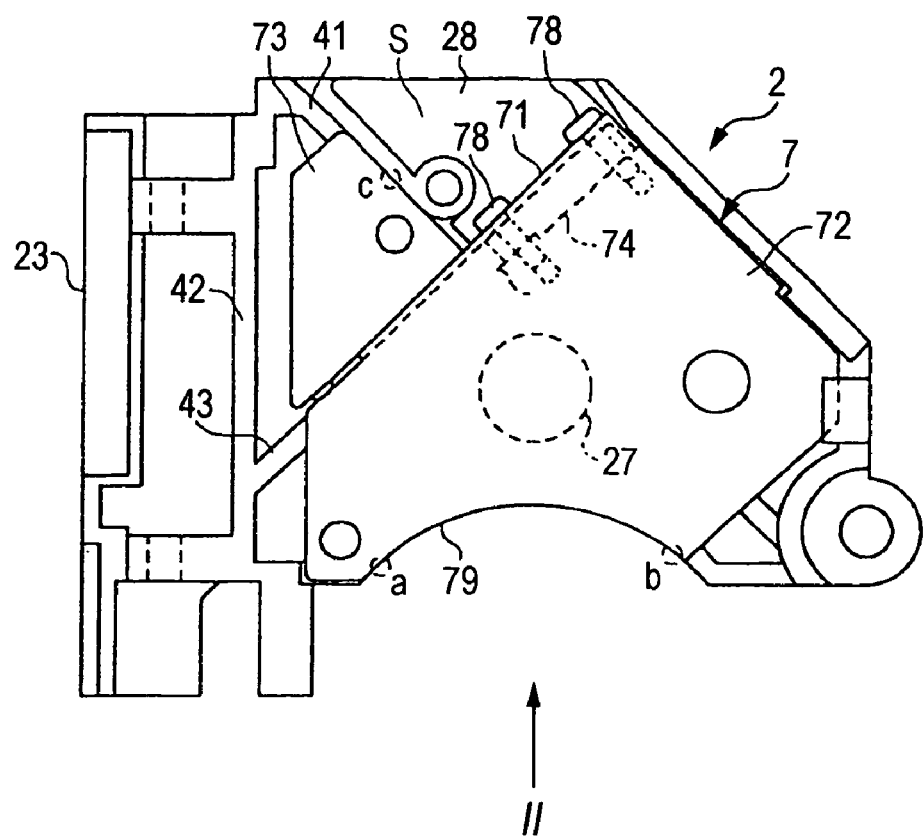
FIG. 1 is a plan view of a base member for use in an optical pickup according to an embodiment of the invention as seen in a back side thereof in a state where a radiator plate is mounted to the base member.
Figure 2:
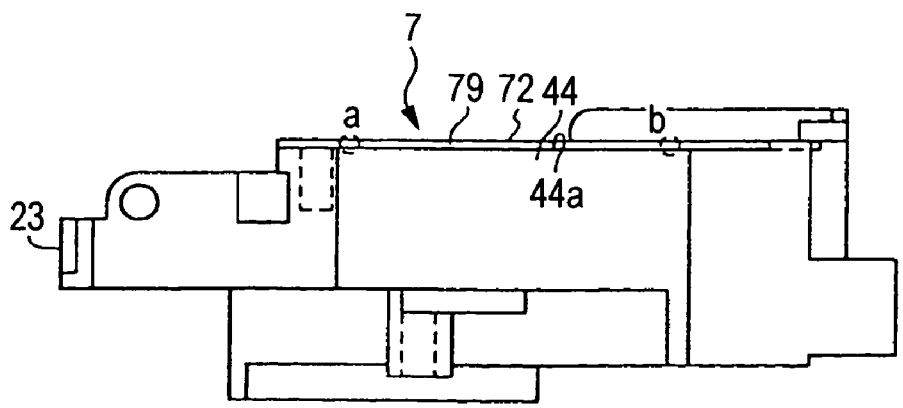
FIG. 2 is a view of the base member seen in a direction indicated by an arrow II in FIG. 1.
Figure 3:
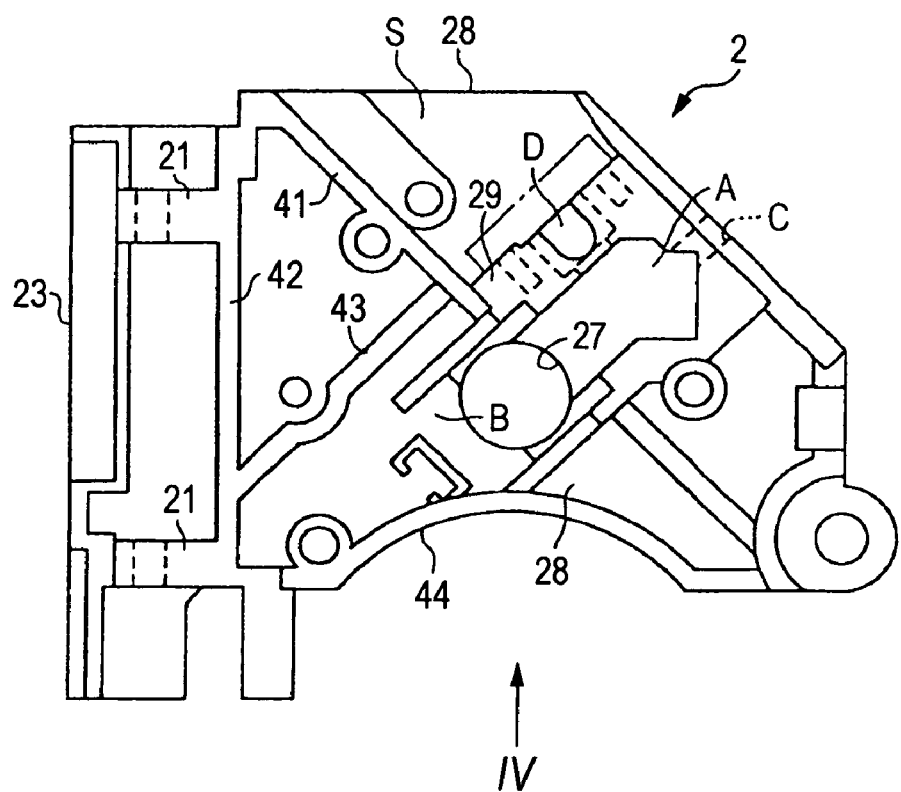
FIG. 3 is a plan view of the base member in a state in which the radiator plate is removed from the base member.
Figure 4:
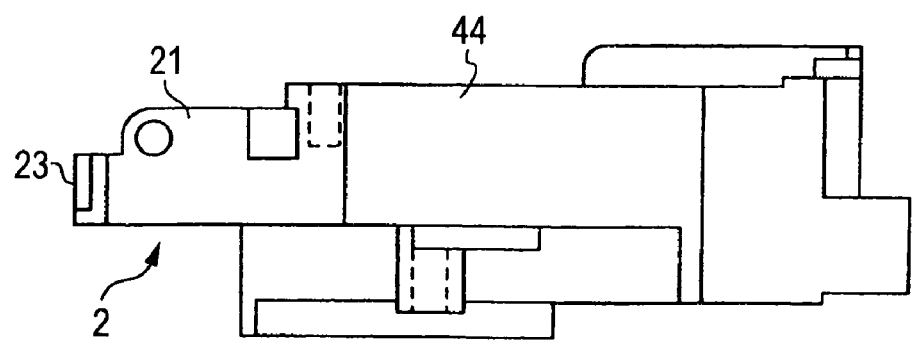
FIG. 4 is a view of the base member seen in a direction indicated by an arrow IV in FIG. 3.
Figure 5:
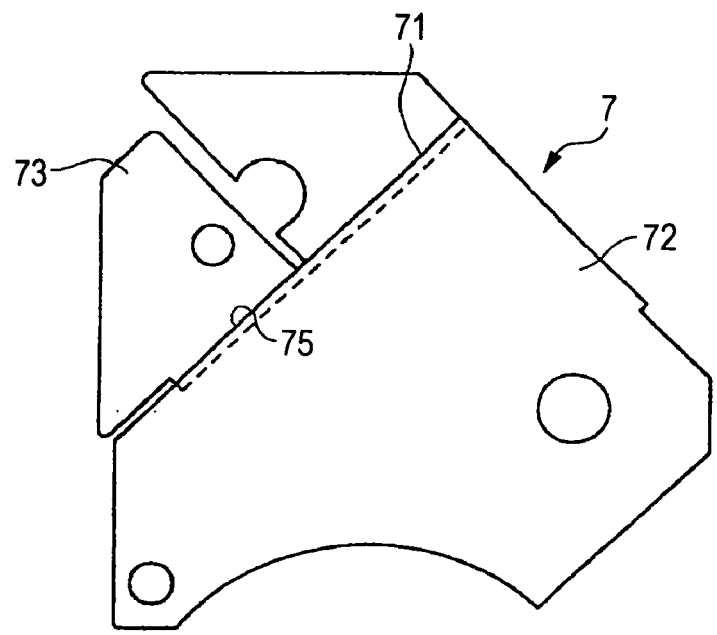
FIG. 5 is a plan view of the radiator plate.
Figure 6:
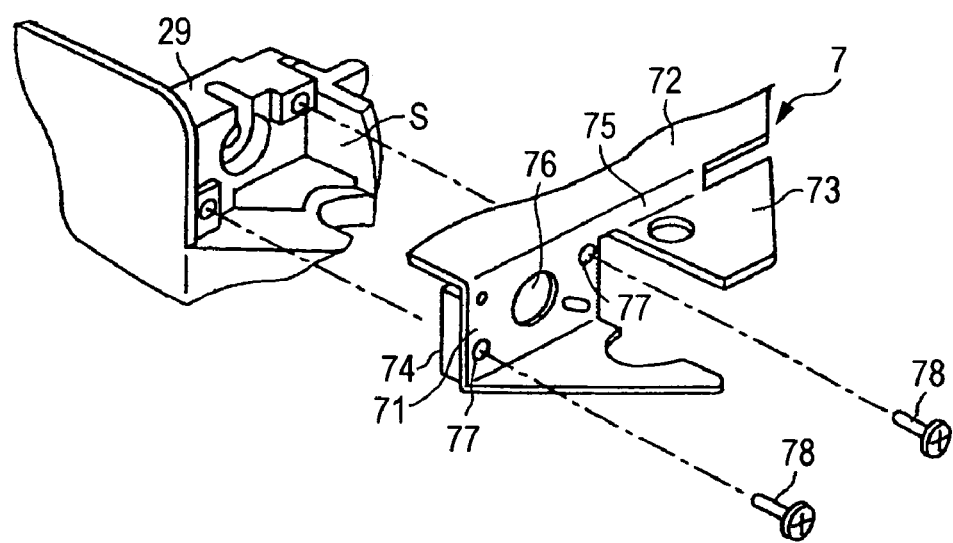
FIG. 6 is an exploded perspective view describing locations where the radiator plate is screwed with machine screws.

FIG. 1 is a plan view resulting when a back member 2 for use in an optical pickup according to an embodiment of the invention is seen from a back side thereof in a state in which a radiator plate 7 is mounted on the back member 2, FIG. 2 is a view of the base member 2 seen in a direction indicated by an arrow II in FIG. 1, FIG. 3 is a plan view of the base member 2 in a state in which the radiator plate 7 is removed from the base member 2, FIG. 4 is a view of the base member 2 seen in a direction indicated by an arrow IV in FIG. 3, FIG. 5 is a plan view of the radiator plate 7, and FIG. 6 is an exploded perspective view describing locations where the radiator plate 7 is screwed with machine screws.

As shown in FIGS. 3 and 4, the base member 2 has a circular light passage hole 27 which is opened in a substantially central portion of a base plate portion 28, and a collimator lens (not shown) is mounted in the light passage hole 27. In addition, a mounting location A of a half mirror (not shown), a mounting location B of a reflecting plate (not shown) and a mounting location C of a light receiving element (not shown) are determined in relation to the position where the light passage hole 27 is opened, and furthermore, a mounting location D of a light emitting element (not shown) is also determined. A mounting wall 29 erected on the base plate portion 28 corresponds to the mounting location D of the light emitting element.

A rib 41 is erected on the base plate portion 28 which intersects with the mounting wall 29 and defines an inwardly angled space in cooperation with the mounting wall 29 and the base plate portion 28, and three ribs including the rib 41, an external rib 42 having a rack 23 and bearings 21 and an internal rib 43 are arranged in the form of a truss so as to reinforce the base plate portion 28. In addition, a curved enclosure wall 44 is erected on the base plate portion 28 on a substantially opposite side to the mounting wall 29 across the light passage hole 27.

Figure 10:
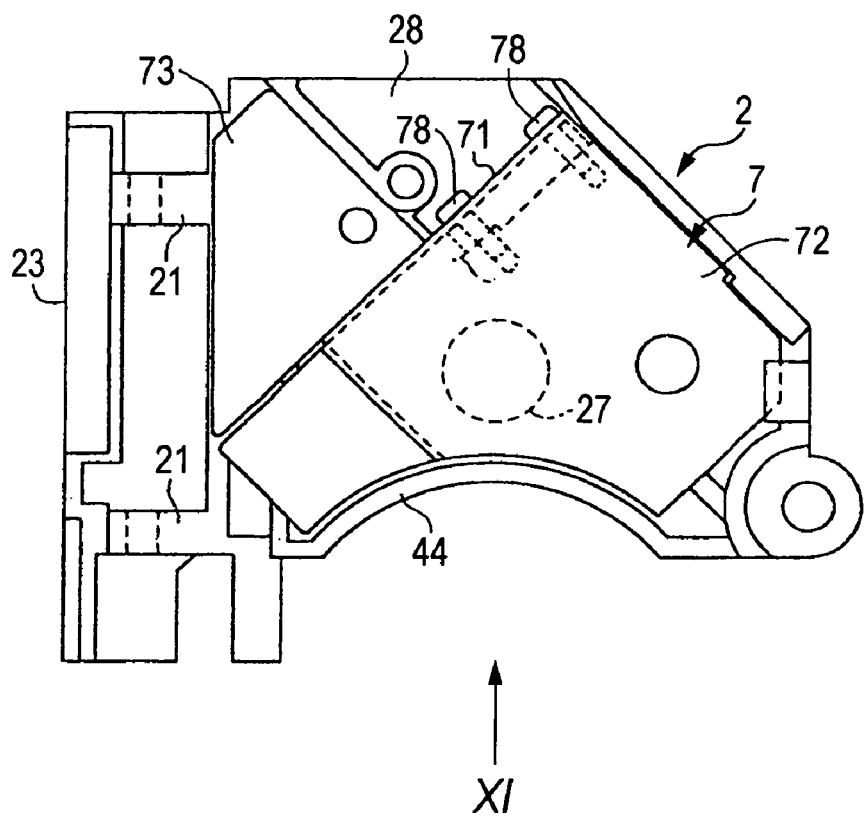
FIG. 10 is a schematic plan view of the base member used in the conventional optical pickup.
Figure 11:
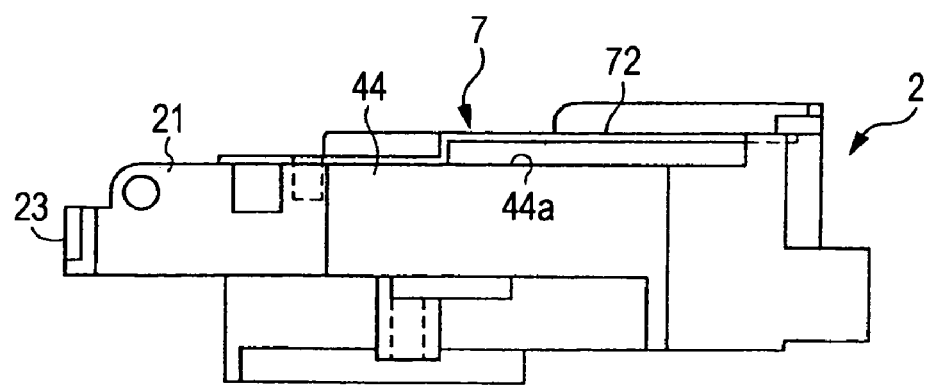
FIG. 11 is a view of the base member seen in a direction indicated by an arrow XI in FIG. 10.

While the construction of the base member 2 that has been described here is substantially similar to that of the base member 2 of the related art that was described by reference to FIGS. 10 and 11, as is seen when looking at FIGS. 4 and 11 together, in this embodiment, the height of the enclosure wall 4 is made higher than that of the enclosure wall 44 of the related art (which will be described further later on).

As shown in FIGS. 5 and 6, the radiator plate 7 has amounting piece 71 and a large surface plate portion 72 which is formed by being bent at right angles relative to the mounting piece 71, and a stepped piece portion 75 is formed by being bent at right angles relative to the surface plate portion 72 at a location adjacent to the mounting piece 71. Furthermore, a projecting portion 73 is formed by being bent from the stepped piece portion 75. Note that a hole 76 through which an electrical wire of the light emitting element made up of a laser diode is pulled out and machine screw passage holes 77 are provided in the mounting piece 71.

As shown in FIG. 6, the radiator plate 7, together with a radiator block 74 which is mounted on the light emitting element, is screwed to the mounting wall 29 at two locations with machine screws in a state where the mounting piece 71 of the radiator plate 7 is superimposed on the radiator block 74. Reference numeral 78 denotes the mounting machine screw. Thus, when the mounting piece 71 is screwed to the mounting wall 29 with the machine screws, as shown in FIGS. 1 and 2, the surface plate portion 72 of the radiator plate 7 covers not only the light passage hole 27 in the base plate portion 28 but also the half mirror mounting location A, the reflecting plate mounting location B, the light receiving element mounting location C and the light emitting mounting location D, which are shown in FIG. 3, and a curved edge 79 of an end of the surface plate portion 72 overlies a top portion of the curved enclosure wall 44 of the base member 2. Furthermore, the projecting piece 73 overlies the rib 41.

Here, the reason why the height of the enclosure wall 44 is higher than that of the conventional enclosure wall is because the edge 79 of the end of the surface plate portion 72 is allowed to overlie the top portion 44a of the enclosure wall 44, even in the event that the surface plate portion 72 of the radiator plate 7 is left flat. Consequently, the surface plate portion 72 and the enclosure wall 44 can overlaps each other in a state where the edge 79 of the end of the surface plate portion 72 is formed into a stepped shape, while the height of the enclosure wall 44 is maintained the same as that of the conventional enclosure wall.

In this embodiment, the mounting piece 71 of the radiator plate 7 is screwed to the mounting wall 29 of the base member 2 with the machine screws, and, in addition to this, the superimposed portion where the edge 79 of the end of the surface plate portion 72 is superimposed on the top portion 44a of the enclosure wall 44 is point joined together with an adhesive at two locations a, b at both end portions thereof. It thus follows from this construction that the radiator plate 7 is secured to the base member 2 on both sides across the light passage hole 27 in the base member 2.

Figure 7A:
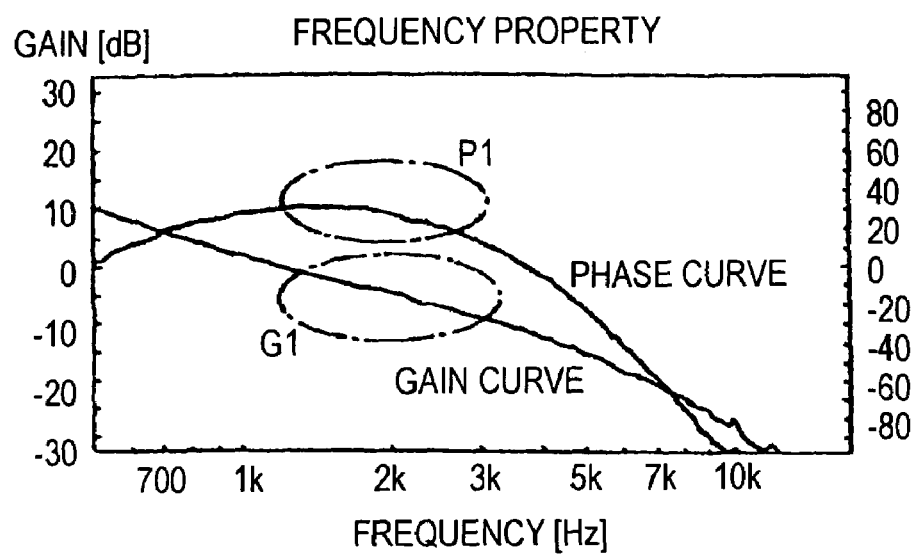
FIG. 7A is a diagram showing a gain curve and a phase curve in a focusing system of a base member for use in the optical pickup according to the embodiment of the invention.
Figure 7B:
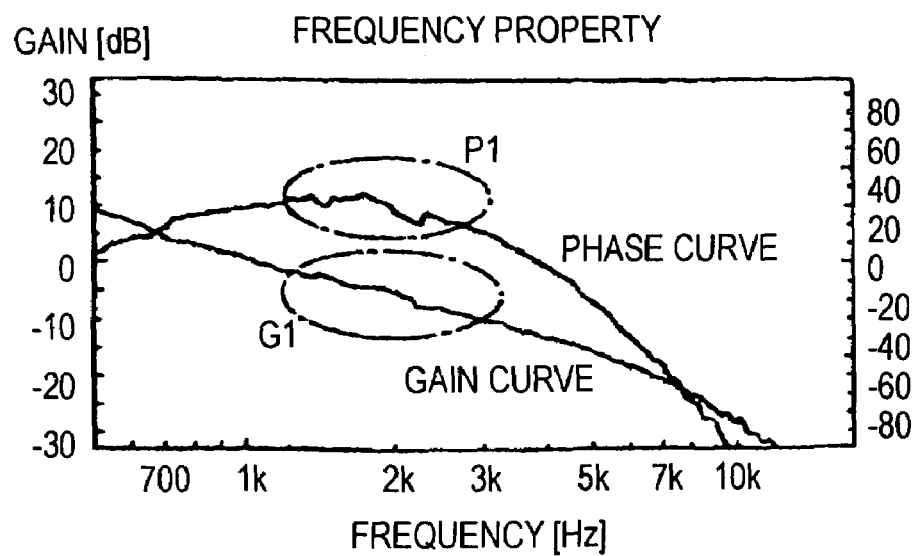
FIG. 7B is a diagram showing a gain curve and a phase curve in a focusing system of a base member of a convention optical pickup.
Figure 8:
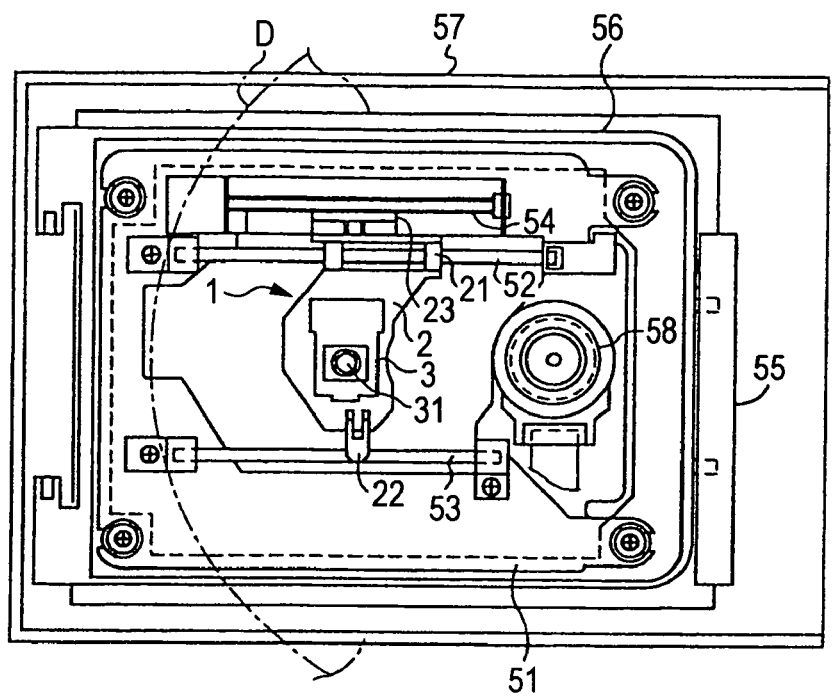
FIG. 8 is a plan view showing an example of a schematic configuration of an optical disk apparatus.
Figure 9:
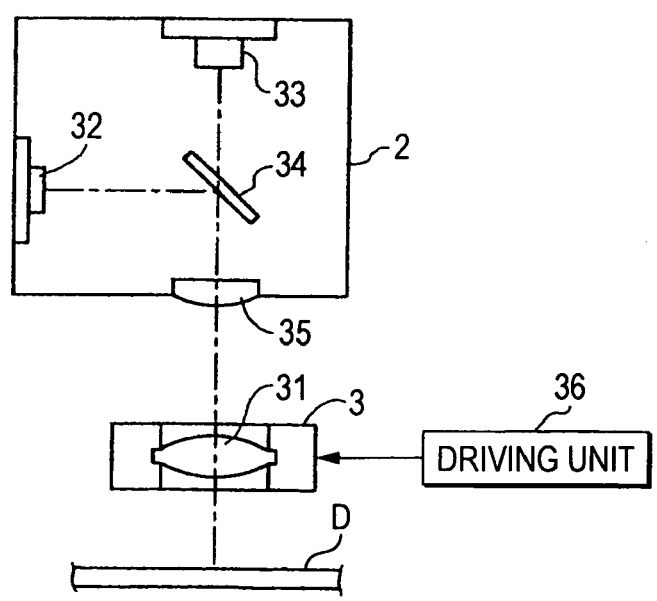
FIG. 9 is an explanatory drawing of an optical system of the optical pickup.

FIG. 7A shows a gain curve and a phase curve of a focusing system of the base member 2 shown in FIG. 1 or 2, that is, of the base member 2 in which the radiator plate 7 is secured to the base member 2 on the both sides across the light passage hole 27 in the base member 2. When looking at the gain and phase curves shown in FIG. 7A and the conventional gain and phase curves shown in FIG. 7B together, it is recognized that the irregular fluctuation of 1 to 2 kHz of the gain curve or the phase curve appearing in the range G1 or P1 in FIG. 7B disappears almost completely in FIG. 7A. It is assumed from this that as a result of the increase in the rigidity of the base member 2 by the reinforcement function of the radiator plate 7, the resonance frequency band of the base member 2 has been shifted to a higher frequency side than the vibration frequency band of the lens holder 3 (refer to FIG. 3) that is generated when the lens holder 3 is controlled to be displaced. Consequently, according to the embodiment, there is eliminated a risk that the gain curve of the phase curve of the base member 2 fluctuates irregularly in the range of 1 to 2 kHz, and the situation is prevented from occurring in which the vibration of the base member 2 is transmitted to the turntable 58, which was described by reference to FIG. 8, to thereby increase the vibration of the optical disk D, whereby, when the vibration frequency band generated when the lens holder 3 is controlled to be displaced is adjusted properly, the focusing servo properties of the optical pickup 1 are increased, so that the writing and reading reliability is increased.

While the example has been described in this embodiment in which the superimposed portion where the edge of the end of the surface plate portion 72 of the radiator plate 7 whose mounting piece 71 is screwed to the mounting wall 29 of the base member 2 with the machine screws is superimposed on the top portion 44a of the enclosure wall 44 of the base member 2 is point joined together with the adhesive at the two locations a, b at the both end portions thereof, both or one of the two locations at the both end portions of the superimposed portion may be screwed with machine screws or a machine screw. Alternatively, only one location on the superimposed portion may be joined together with the adhesive or screwed with a machine screw, or the whole of the superimposed location is joined with the adhesive or screwed with machine screws. Furthermore, in addition to the joining of the superimposed location where the edge of the end of the surface plate portion 72 of the radiator plate 7 is superimposed on the top portion 44a of the enclosure wall 44, a superimposed location where the projecting piece 73 is superimposed on a top portion, which is denoted by reference character c in FIG. 1, of the rib 41 may be joined with the adhesive or screwed with machine screws.

Note that like reference numerals are given to like or corresponding portions in FIGS. 1 to 11.

What is claimed is:

1. An optical pickup comprising:
   a lens holder having an objective lens that is displace controlled in a focusing direction and a tracking direction relative to an optical disk;
   an optical component that is adapted to cooperate with the objective lens so as to implement an emission of light to the optical disk and a reception of reflected light;
   a radiator plate formed of a sheet metal for radiating heat generated in the optical component, the radiator plate having a mounting piece and a surface plate portion;
   a base member on which the lens holder and the optical component are mounted, the base member being access controlled along a radial direction of the optical disk and being formed of a synthetic resin molded body, the base member having a base plate portion in which a light passage hole is opened in such a manner as to face the objective lens, a mounting wall on which the optical component is mounted and the mounting piece of the radiator plate is secured, the mounting wall being erected on the base plate portion, and an enclosure wall that is erected substantially on an opposite side to the mounting wall across the light passage hole; and
   a screw for securing the mounting piece to the mounting wall;
   wherein the surface plate portion is formed by bending a base portion of the mounting piece so as to cover the light passage hole and extends to the enclosure wall in such a manner that an end of the surface plate portion is superimposed on a top portion of the enclosure wall, and a superimposed portion is point joined together with an adhesive at two locations at both end portions thereof, whereby a resonance frequency band of a vibration of the base member which is generated in association with the displacement control of the lens holder in the focusing direction is shifted to a higher frequency side than a vibration frequency band of a vibration of the lens holder which is generated when the displacement control is implemented.

2. An optical pickup comprising:
   a lens holder having an objective lens that is displace controlled in a focusing direction and a tracking direction relative to an optical disk;
   an optical component that is adapted to cooperate with the objective lens so as to implement an emission of light to the optical disk and a reception of reflected light;

a radiator plate formed of a sheet metal for radiating heat generated in the optical component, the radiator plate having a mounting piece and a surface plate portion; and a base member on which the lens holder and the optical component are mounted, the base member being access controlled along a radial direction of the optical disk and being formed of a synthetic resin molded body, the base member having a base plate portion in which a light passage hole is opened in such a manner as to face the objective lens, a mounting wall on which the optical component is mounted and the mounting piece of the radiator plate is secured, the mounting wall being erected on the base plate portion, and an enclosure wall that is erected substantially on an opposite side to the mounting wall across the light passage hole;

wherein the surface plate portion is formed by bending a base portion of the mounting piece and extends toward the enclosure wall and an end of the surface plate portion is fixed to a top portion of the enclosure wall.

3. The optical pickup according to claim 2, wherein the surface plate portion covers the light passage hole.

4. The optical pickup according to claim 2, wherein a height of the enclosure wall is determined such that the end of the surface plate portion is allowed to be superimposed on the top portion of the enclosure wall.

5. The optical pickup according to claim 4, wherein a superimposed portion of the end of the surface plate portion on the top portion of the enclosure wall is point joined together with an adhesive.

6. The optical pickup according to claim 4, wherein a superimposed portion of the end of the surface plate portion on the top portion of the enclosure wall is point joined together with an adhesive at two locations at both end portions thereof.

7. The optical pickup according to claim 5, wherein a rib is erected on the base plate portion which intersects with the mounting wall and which is adapted to define an inwardly angled space in cooperation with the mounting wall and the base plate portion, and wherein a projecting piece which is superimposed on a top potion of the rib so as to be point joined to the top portion with an adhesive is provided continuously to a stepped piece portion which is formed by being bent from the surface plate portion at a location adjacent to the mounting piece.

* * * * *